US010103974B2

(12) United States Patent
Sheu et al.

(10) Patent No.: US 10,103,974 B2
(45) Date of Patent: Oct. 16, 2018

(54) SOFTWARE-DEFINED NETWORK CONTROLLER AND MULTIPATH ROUTING METHOD

(71) Applicant: National Tsing Hua University, Hsinchu (TW)

(72) Inventors: Jang-Ping Sheu, Hsinchu (TW); Lee-Wei Liu, New Taipei (TW)

(73) Assignee: National Tsing Hua University, Hsinchu (TW)

( * ) Notice: Subject to any disclaimer, the term of this patent is extended or adjusted under 35 U.S.C. 154(b) by 179 days.

(21) Appl. No.: 15/221,604

(22) Filed: Jul. 28, 2016

(65) Prior Publication Data

US 2018/0019940 A1    Jan. 18, 2018

(30) Foreign Application Priority Data

Jul. 12, 2016    (TW) .............................. 105121860 A

(51) Int. Cl.
*H04L 12/707* (2013.01)
*H04L 12/751* (2013.01)
(Continued)

(52) U.S. Cl.
CPC .............. *H04L 45/24* (2013.01); *H04L 45/02* (2013.01); *H04L 45/124* (2013.01);
(Continued)

(58) Field of Classification Search
CPC ......... H04L 45/24; H04L 45/64; H04L 45/02; H04L 45/125; H04L 45/38
(Continued)

(56) References Cited

U.S. PATENT DOCUMENTS 8,693,374 B1 *  4/2014  Murphy .................. H04L 12/28
                                                                370/255
9,178,943 B2   11/2015  DeCusatis et al.
(Continued)

FOREIGN PATENT DOCUMENTS

| CN | 102547856 | 7/2015 |
| TW | I523459 | 2/2016 |
| TW | I523463 | 2/2016 |

OTHER PUBLICATIONS

"Office Action of Taiwan Counterpart Application," dated Aug. 28, 2017, p. 1-p. 6.
(Continued)

*Primary Examiner* — Jae Y Lee
*Assistant Examiner* — Jean F Voltaire
(74) *Attorney, Agent, or Firm* — JCIPRNET

(57) ABSTRACT

A software-defined network (SDN) controller and a multipath routing method thereof are provided. In the method, a maximum bottleneck bandwidth (MBB) and a minimum hop count (MHC) of each of the nodes in the SDN are initiated. Next, a source node is visited, and neighboring nodes thereof are discovered to relax paths between the source node and each neighboring node. Then, a forwarding node having a maximum MBB among other nodes is visited, and its neighboring nodes which are connected therewith and unvisited are discovered to relax the paths between the forwarding node and each neighboring node. Afterwards, the rest of the nodes are consecutively visited until all nodes are visited. Finally, a disjoint path lookup table is established according to relation between the paths recorded for each node, and accordingly k disjoint paths having the maximum bottleneck bandwidth are found for transmitting k sub-flows divided from a data flow.

16 Claims, 10 Drawing Sheets

(51) Int. Cl.
*H04L 12/729* (2013.01)
*H04L 12/721* (2013.01)
*H04L 12/715* (2013.01)
*H04L 12/735* (2013.01)
*H04L 12/717* (2013.01)
*H04L 12/741* (2013.01)
*H04L 12/801* (2013.01)

(52) U.S. Cl.
CPC .......... *H04L 45/125* (2013.01); *H04L 45/128* (2013.01); *H04L 45/38* (2013.01); *H04L 45/42* (2013.01); *H04L 45/64* (2013.01); *H04L 45/54* (2013.01); *H04L 47/193* (2013.01)

(58) Field of Classification Search
USPC ......................................................... 370/238
See application file for complete search history.

(56) References Cited

U.S. PATENT DOCUMENTS

| | | | | |
|---|---|---|---|---|
| 2002/0181402 | A1* | 12/2002 | Lemoff | H04L 45/02 370/238 |
| 2004/0203820 | A1* | 10/2004 | Billhartz | H04L 45/26 455/452.1 |
| 2005/0286464 | A1* | 12/2005 | Saadawi | H04L 45/08 370/328 |
| 2012/0155264 | A1* | 6/2012 | Sharma | H04L 43/0852 370/232 |
| 2013/0107729 | A1 | 5/2013 | Wagner et al. | |
| 2014/0189074 | A1* | 7/2014 | Parker | H04L 63/20 709/220 |
| 2015/0063112 | A1* | 3/2015 | Wu | H04L 45/302 370/235 |
| 2017/0295088 | A1* | 10/2017 | van der Kluit | H04L 45/1287 |

OTHER PUBLICATIONS

Sheu et al., "An Efficient Multipath Routing Algorithm for Multipath TCP in Software-Defined Networks," European Conference on Networks and Communications (EuCNC), Jun. 2016, pp. 1-6.

Ronald Van Der Pol et al., "Experiences with MPTCP in an intercontinental OpenFlow network," TERENA Networking Conference (TNC), Jun. 3-6, 2013, pp. 1-8.

Ruen Chze Loh et al., "A Greedy Technique for Finding the Most Reliable Edge-Disjoint-Path-Set in a Network ," 14th IEEE Pacific Rim International Symposium on Dependable Computing (PRDC), Dec. 15-17, 2008, pp. 216-223.

* cited by examiner

| | $cp_1$ | $cp_2$ | $cp_3$ | $cp_4$ | $cp_5$ | $cp_6$ | $cp_7$ | $cp_8$ | $cp_9$ | $cp_{10}$ | $cp_{11}$ | #path | Min BB |
|---|---|---|---|---|---|---|---|---|---|---|---|---|---|
| $cp_1$ | 0 | 0 | 0 | 1 | 0 | 1 | 1 | 0 | 0 | 1 | 1 | 3 | 4 |
| $cp_2$ | 0 | 0 | 0 | 0 | 1 | 1 | 0 | 1 | 1 | 1 | 0 | 3 | 4 |
| $cp_3$ | 0 | 0 | 0 | 1 | 0 | 1 | 1 | 0 | 0 | 1 | 1 | 3 | 4 |
| $cp_4$ | 1 | 0 | 1 | 0 | 0 | 0 | 0 | 1 | 0 | 1 | 0 | 3 | 4 |
| $cp_5$ | 0 | 1 | 0 | 0 | 0 | 0 | 1 | 0 | 0 | 1 | 1 | 3 | 4 |
| $cp_6$ | 1 | 1 | 1 | 0 | 0 | 0 | 1 | 1 | 0 | 0 | 0 | 3 | 7 |
| $cp_7$ | 1 | 0 | 1 | 0 | 1 | 1 | 0 | 0 | 1 | 0 | 0 | 3 | 7 |
| $cp_8$ | 0 | 1 | 0 | 1 | 0 | 1 | 0 | 0 | 0 | 0 | 0 | 3 | 7 |
| $cp_9$ | 0 | 1 | 0 | 0 | 0 | 0 | 0 | 0 | 0 | 1 | 0 | 3 | 4 |
| $cp_{10}$ | 1 | 1 | 1 | 1 | 1 | 0 | 0 | 0 | 1 | 0 | 0 | 3 | 4 |
| $cp_{11}$ | 1 | 0 | 1 | 0 | 1 | 0 | 0 | 0 | 0 | 0 | 0 | 2 | 4 |

|     | cp₁ | cp₂ | cp₃ | cp₄ | cp₅ | cp₆ | cp₇ | cp₈ | cp₉ | cp₁₀ | cp₁₁ | #path | Min BB |
|-----|-----|-----|-----|-----|-----|-----|-----|-----|-----|------|------|-------|--------|
| cp₁ | 0 | 0 | 0 | 1 | 0 | 1 | 1 | 0 | 0 | 1 | 1 | 3 | 4 |
| cp₂ | 0 | 0 | 0 | 0 | 1 | 1 | 0 | 1 | 1 | 1 | 0 | 3 | 4 |
| cp₃ | 0 | 0 | 0 | 1 | 0 | 1 | 1 | 0 | 0 | 1 | 1 | 3 | 4 |
| cp₄ | 1 | 0 | 1 | 0 | 0 | 0 | 0 | 1 | 0 | 1 | 0 | 3 | 4 |
| cp₅ | 0 | 1 | 0 | 0 | 0 | 0 | 1 | 0 | 0 | 1 | 1 | 3 | 4 |
| cp₆ | 1 | 1 | 1 | 0 | 0 | 0 | 1 | 1 | 0 | 0 | 0 | 3 | 7 |
| cp₇ | 1 | 0 | 1 | 0 | 1 | 1 | 0 | 0 | 1 | 0 | 0 | 3 | 7 |
| cp₈ | 0 | 1 | 0 | 1 | 0 | 1 | 0 | 0 | 0 | 0 | 0 | 3 | 7 |
| cp₉ | 0 | 1 | 0 | 0 | 0 | 0 | 0 | 0 | 0 | 1 | 0 | 3 | 4 |
| cp₁₀ | 1 | 1 | 1 | 1 | 1 | 0 | 0 | 0 | 1 | 0 | 0 | 3 | 4 |
| cp₁₁ | 1 | 0 | 1 | 0 | 1 | 0 | 0 | 0 | 0 | 0 | 0 | 2 | 4 |

|  | $cp_1$ | $cp_2$ | $cp_3$ | $cp_4$ | $cp_5$ | $cp_6$ | $cp_7$ | $cp_8$ | $cp_9$ | $cp_{10}$ | $cp_{11}$ | #path | Min BB |
|---|---|---|---|---|---|---|---|---|---|---|---|---|---|
| $cp_1$ | 0 | 0 | 0 | 1 | 0 | 1 | 1 | 0 | 0 | 1 | 1 | 3 | 4 |
| $cp_2$ | 0 | 0 | 0 | 0 | 1 | 1 | 0 | 1 | 1 | 1 | 0 | 3 | 4 |
| $cp_3$ | 0 | 0 | 0 | 1 | 0 | 1 | 1 | 0 | 0 | 1 | 1 | 3 | 4 |
| $cp_4$ | 1 | 0 | 1 | 0 | 0 | 0 | 0 | 1 | 0 | 1 | 0 | 3 | 4 |
| $cp_5$ | 0 | 1 | 0 | 0 | 0 | 0 | 1 | 0 | 0 | 1 | 1 | 3 | 4 |
| $cp_6$ | 1 | 1 | 1 | 0 | 0 | 0 | 1 | 1 | 0 | 0 | 0 | 3 | 7 |
| $cp_7$ | 1 | 0 | 1 | 0 | 1 | 1 | 0 | 0 | 1 | 0 | 0 | 3 | 7 |
| $cp_8$ | 0 | 1 | 0 | 1 | 0 | 1 | 0 | 0 | 0 | 0 | 0 | 3 | 7 |
| $cp_9$ | 0 | 1 | 0 | 0 | 0 | 0 | 0 | 0 | 0 | 1 | 0 | 3 | 4 |
| $cp_{10}$ | 1 | 1 | 1 | 1 | 1 | 0 | 0 | 0 | 1 | 0 | 0 | 3 | 4 |
| $cp_{11}$ | 1 | 0 | 1 | 0 | 1 | 0 | 0 | 0 | 0 | 0 | 0 | 2 | 4 |

SOFTWARE-DEFINED NETWORK CONTROLLER AND MULTIPATH ROUTING METHOD

CROSS-REFERENCE TO RELATED APPLICATION

This application claims the priority benefit of Taiwan application serial no. 105121860, filed on Jul. 12, 2016. The entirety of the above-mentioned patent application is hereby incorporated by reference herein and made a part of this specification.

BACKGROUND

Field of the Invention

The disclosure is related to a network system and a routing method and more particularly, to a software-defined network controller and a multipath routing method thereof.

Description of Related Art

A software-defined network (SDN) is a new network paradigm. It separates the network control plane from the data forwarding plane and provides a central monitor of network states. The SDN is divided into three layers, namely, a control plane layer, a data plane layer, and an application layer. The control plane layer makes decision for a network data flow and uses a standard protocol for the communication with the data plane layer. It can not only grasp information from the data plane layer, such as link info nation, switch information and information related to network states, but also control the data plane layer to execute specific operations on incoming data.

With the rapid growth of network traffic, conventional transmission through single path can no longer effectively utilize network resources. Instead, a recently developed multipath routing algorithm can be used in combination with a multipath TCP (MPTCP) to select a plurality of paths for transmitting data, by which a data flow is divided into a plurality of sub-flows for transmission, thereby increasing end-to-end transmission throughput.

MPTCP is an extension of TCP, and an MPTCP transmitter divides a regular TCP flow into several TCP sub-flows and transmits the same through multiple network paths. Finally, an MPTCP receiver aggregates the sub-flows and reassembles the data packet coming from the network paths. Although the MPTCP utilizes different paths in the networks, the MPTCP itself is not a routing algorithm, and relies on algorithms, such as Open Shortest Path First/Equal Cost Multipath (OSPF/ECMP) to hash different sub-flows to different paths for transmission.

However, the OSPF/ECMP routing algorithms are not flexible enough to represent all possible solutions for routing and also not suitable for some dynamic load balancing protocols. Furthermore, the diversity of multiple paths is important for MPTCP because the selection of paths influences the network throughput. If the sub-flows of every data use the same path, it would result in the sub-flows competing with each other for the network resources, which will reduce the network throughput.

SUMMARY

The disclosure provides a software-defined network (SDN) controller and a multipath routing method thereof, capable of providing better throughput, smaller path bandwidth difference and a shorter average path length for a data flow.

According to an embodiment of the disclosure, a multipath routing method of an SDN, adapted to divide a data flow into k sub-flows for transmission by a controller, is provided, wherein k is an integer larger than 1. In this method, a maximum bottleneck bandwidth (MBB) and a minimum hop count (MHC) of each of a plurality of nodes in the SDN are first initiated. Next, a source node is visited, and neighboring nodes connected with the source node are discovered, so as to relax paths between the source node and each of the neighboring nodes. The relaxing operation refers to updating node information, recording new MBBs and MHCs, setting the source node as being visited after the relaxing operation, and recording the relaxed paths. Then, a node having a maximum MBB among other unvisited nodes is consecutively visited to serve as a forwarding node. Neighboring nodes which are connected with the forwarding node and unvisited are discovered, so as to relax the paths from the forwarding node to each of the neighboring nodes. The forwarding node is set as being visited after the relaxing operation, and the relaxed paths are recorded. The previous step is repeated to consecutively visit other unvisited nodes until all the nodes are visited. Finally, a disjoint path lookup table is established according to relation between the paths recorded for each node, and accordingly k disjoint paths having the maximum bottleneck bandwidth are found for transmitting the k sub-flows. When there are multiple discovered nodes with same MBB, the node with smallest MHC is selected for transmitting the sub-flow.

In an embodiment of the invention, the step of discovering the neighboring nodes which are connected with the forwarding node and unvisited, so as to relax the paths from the forwarding node to each of the neighboring nodes includes determining whether the MHC of the visited forwarding node is greater than the MHC of each of the discovered neighboring nodes. If yes, one-way relaxing operation is executed on the paths between the forwarding node and the neighboring nodes; and if no, two-way relaxing operation is executed on the paths between the forwarding node and the neighboring nodes.

In an embodiment of the invention, the one-way relaxing operation includes relaxing the path to each of the neighboring nodes through the forwarding node, and the two-way relaxing operation includes relaxing the path to each of the neighboring nodes through the forwarding node, and relaxing the path to the forwarding node through each of the neighboring nodes.

In an embodiment of the invention, the step of recording the relaxed paths includes determining whether the number of the paths recorded for each of the nodes is greater than m, wherein m is an integer larger than 1. If the number is greater than m, only former m paths having the largest MBBs among the relaxed paths are retained.

In an embodiment of the invention, the step of establishing the disjoint path lookup table according to the relation between the paths recorded for each of the nodes includes sorting the paths according to the MBB corresponding to each of the paths, listing the sorted paths in the disjoint path lookup table, determining whether each pair of the paths joint with each other, and accordingly recording joint information related to each pair of the paths in the disjoint path lookup table.

In an embodiment of the invention, the step of finding the k disjoint paths having the maximum bottleneck bandwidth for transmitting the k sub-flows according to the disjoint path lookup table includes sequentially searching k paths disjointing from one another to serve as a first set of paths by starting from the path which is sorted in front of the disjoint path lookup table and repeating the previous step to sequentially search k paths disjointing from one another to serve them another set of paths starting from the path sorted secondarily in the disjoint path lookup table, and finally selecting a set of paths having the maximum bottleneck bandwidth from the first set of paths and the another sets of paths to serve as the k disjoint paths. If the selected paths have the same bottleneck bandwidth, the path having the smallest hop count is selected.

In an embodiment of the invention, the step of sequentially searching the k paths disjointing from one another to serve as the another set of paths starting from the path sorted secondarily in the disjoint path lookup table includes sequentially searching the k paths disjointing from one another to serve as the another set of paths starting from the path sorted secondarily in the disjoint path lookup table until all the paths in the disjoint path lookup table are searched. If k paths are not found, the maximum number of the disjoint paths is selected.

In an embodiment of the invention, the MBB of each of the nodes is initiated as 0, and the MHC of each of the nodes is initiated as infinite.

In an embodiment of the invention, after the relaxing of the path from the forwarding node to each of the neighboring nodes is completed, the method includes setting the MBB of each of the neighboring nodes as the maximum of the MBBs of the relaxed paths, and setting the MHC of each of the neighboring nodes as a smallest number of the nodes hopping from the source node to the neighboring node in each of the relaxed paths.

According to an embodiment of the disclosure, an SDN controller including a network interface unit device, a storage device and a processor is provided. The network interface device is coupled to a plurality of nodes in an SDN. The processor is coupled to the network interface device and the storage device. The processor initiates an MBB and an MHC of each of the nodes in the SDN after receiving a transmission request of a data flow. Next, the processor visits a source node of the nodes, discovers neighboring nodes connected with the source node to relax paths between the source node and each of the neighboring nodes, and sets the source node as being visited and records the relaxed paths in the storage device after relaxing the paths. Then, the processor consecutively visits a node having a maximum MBB among other unvisited nodes to serve as a forwarding node, discovers neighboring nodes which are connected with the forwarding node and unvisited to relax the paths from the forwarding node to each of the neighboring nodes, sets the forwarding node as being visited and records the relaxed paths in the storage device after relaxing the paths, and repeats the previous step until all the nodes are visited. Finally, the processor establishes a disjoint path lookup table according to relation between the paths recorded for each of the nodes in the storage device, and accordingly finds k disjoint paths having the maximum bottleneck bandwidth for transmitting k sub-flows divided from a data flow, wherein k is an integer larger than 1.

In an embodiment of the invention, the processor determines whether the MHC of the visited forwarding node is greater than the MHC of each of the discovered neighboring nodes, and accordingly determines whether to perform a one-way relaxing operation or a two-way relaxing operation on the paths between the forwarding node and the neighboring nodes.

In an embodiment of the invention, the one-way relaxing operation includes relaxing the path to each of the neighboring nodes through the forwarding node, and the two-way relaxing operation includes relaxing the path to each of the neighboring nodes through the forwarding node, and relaxing the path to the forwarding node through each of the neighboring nodes.

In an embodiment of the invention, the processor determines whether the number of the paths recorded for each of the nodes is greater than a predetermined number m, wherein m is an integer larger than 1. If the number is greater than m, the processor retains only former m paths having the largest MBBs among the relaxed paths.

In an embodiment of the invention, the processor sorts the paths according to the MBB corresponding to each of the paths, lists the sorted paths in the disjoint path lookup table, determines whether each pair of the paths joint with each other, and accordingly records joint information related to each pair of the paths in the disjoint path lookup table.

In an embodiment of the invention, the processor sequentially searches k paths disjointing from one another to serve as a first set of paths starting from the path sorted in front of the disjoint path lookup table, repeats the previous step to sequentially search k paths disjointing from one another to serve as another set of paths starting from the path sorted secondarily in the disjoint path lookup table, and selects a set of paths having the maximum bottleneck bandwidth from the first set of paths and the another sets of paths to serve as the k disjoint paths. If the selected paths have the same bottleneck bandwidth, the processor selects the path having the smallest MHC.

In an embodiment of the invention, the processor sequentially searches k paths disjointing from one another to serve as the another set of paths starting from the path sorted secondarily in the disjoint path lookup table until all the paths in the disjoint path lookup table are searched. If k paths are not found, the processor selects the maximum number of the disjoint paths.

In an embodiment of the invention, the processor initiates the MBB of each of the nodes as 0, and initiates the MHC of each of the nodes as infinite ($\infty$).

In an embodiment of the invention, after the relaxing of the path from the forwarding node to each of the neighboring nodes is completed, the processor sets the MBB of each of the neighboring nodes as a maximum of the MBBs of the relaxed paths, and sets the MHC of each of the neighboring nodes as a smallest number of the nodes hopping from the source node to each of the neighboring nodes in each of the relaxed paths.

To sum up, in the SDN controller and the multipath routing method thereof provided by the disclosure, by utilizing the proposed heuristic algorithm, all end-to-end nodes and paths can be found, and the nodes are visited one by one to relax the paths according to the MBB size of each node, and finally the disjoint path lookup table is established based on the relaxed paths, such that multiple paths having the maximum bottleneck bandwidth and disjointing from one another are found for transmitting the k sub-flows divided from the data flow. In this way, a better throughput, a smaller path bandwidth difference and a shorter average path length can be provided for the transmission of the data flow.

To make the above features and advantages of the invention more comprehensible, embodiments accompanied with drawings are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

A multipath algorithm of a software-defined network (SDN) refers to dividing a multipath TCP (MPTCP) flow into a plurality of sub-flows for end-to-end transmission. The disclosure aims at formulating the routing problem to find k disjoint paths with the maximum bottleneck bandwidth (MBB). By finding k disjoint paths and ensuring that the minimum bandwidth of the k disjoint paths is maximized, the MPTCP sub-flows are distributed to those paths for transmission, which can prevent the sub-flows from competing network sources with each other, and reduce bandwidth difference for each path.

Figure 1:
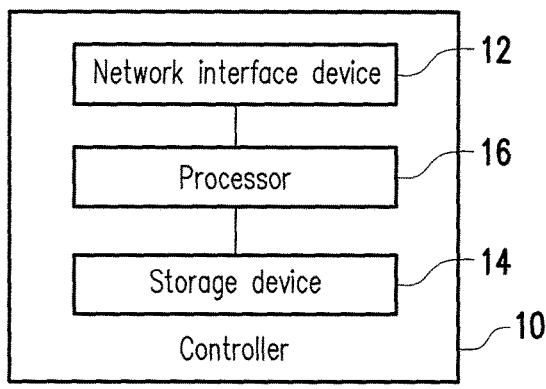
FIG. 1 is a block diagram of a software-defined network (SDN) controller according to an embodiment of the invention.

FIG. 1 is a block diagram of an SDN controller according to an embodiment of the invention. Referring to FIG. 1, an SDN controller 10 of the present embodiment includes a network interface device 12, a storage device 14 and a processor 16. The processor 16 is coupled to the network interface device 12 and the storage device 14.

The network interface device 12 is, for example, a wired or a wireless network card for connecting with a network (e.g., Internet), such that the SDN controller 10 exchanges information with a plurality of nodes (i.e., switches) of the SDN through standard protocols.

The storage device 14 is, for example, any type of fixed or movable random access memory (RAM), read only memory (ROM), flash memory, a similar element or a combination of the aforementioned elements. In the present embodiment, the storage device 14 is configured to not only store a program implementing an SDN multipath routing method of the present embodiment, but also store data flow information, node connection information and information related to network states obtained from the SDN, which include information, such as a source Internet protocol (IP) address, a destination IP address, a source port, a destination port or a service chain of a data flow received by the SDN, and information related to names of nodes passed by from a source to a destination and a sequence of the nodes. The storage device 14 may be further configured to store paths obtained through the SDN multipath routing method of the present embodiment and a disjoint path lookup table established according to the obtained paths.

The processor 16 may be a central processing unit (CPU) or any other programmable microprocessor for general or special use, a digital signal processor (DSP), a programmable controller, an application specific integrated circuit (ASIC), a programmable logic device (PLD) or other similar devices, or a combination of these devices. In the present embodiment, the processor is in charge of controlling the overall operation of the SDN controller 10 and capable of accessing and executing the program stored by the storage device 14 to implement the SND multipath routing method of the present embodiment.

Figure 2:
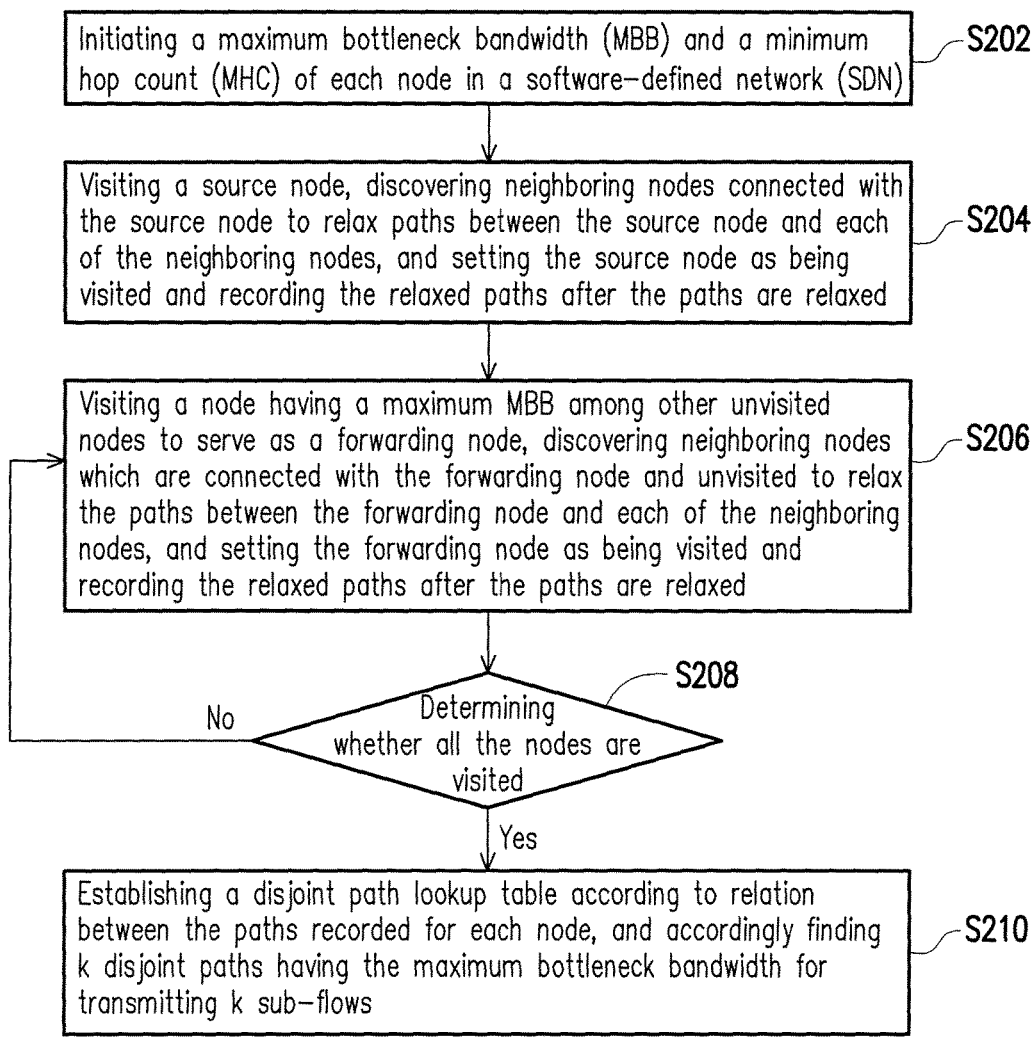
FIG. 2 is a flowchart of a multipath routing method of an SDN according to an exemplary embodiment.

FIG. 2 is a flowchart of a multipath routing method of an SDN according to an exemplary embodiment. Referring to both FIG. 1 and FIG. 2, the method of the present embodiment is applicable to the SDN controller 10, and detailed steps of the method of the present embodiment will be described with reference to each element of the SDN controller 10 depicted in FIG. 1.

First, the processor 16 initiates a maximum bottleneck bandwidth (MBB) and a minimum hop count (MHC) of each of a plurality of nodes in the SDN (step S202). The processor 16 initiates the MBB of each node as 0, and initiates the MHC of each node as infinite (co).

Next, the processor 16 visits a source node of the nodes in the SDN, discovers neighboring nodes connected with the source node in the SDN, so as to relax paths between the source node and each of the neighboring nodes, sets the source node as being visited and records the relaxed paths in the storage device 14 after the paths are relaxed (step S204). To be detailed, a path (u,v) relaxed by a node u demotes a link from the node u to a node v through the path (u,v). Each relaxed path has a relaxation value which is a minimum of the MBB of the path between the nodes among the nodes passed by from the source node to a current node of the path, and the relaxation value may be employed as a basis for subsequent evaluation of routing paths. Accordingly, after relaxing the paths of the source node, the processor 16 sets the source node as being visited and records the paths obtained after executing the path relaxing operation on the source node in the storage device 14.

Then, the processor 16 visits a forwarding node having a maximum MBB among other unvisited nodes in the SDN, discovers neighboring nodes which are connected with the forwarding node and unvisited, so as to relax the paths from the forwarding node to each of the neighboring nodes, sets the forwarding node as being visited and records the relaxed paths after the relaxing operation (step S206). It should be mentioned that when discovering the neighboring nodes of the forwarding node for the path relaxing operation, the processor 16, for example, compares the MHC of each neighboring node with the MHC of the forwarding node, so as to determine whether to execute an one-way relaxing operation or an two-way relaxing operation on the paths between the forwarding node and the neighboring nodes.

Figure 3:
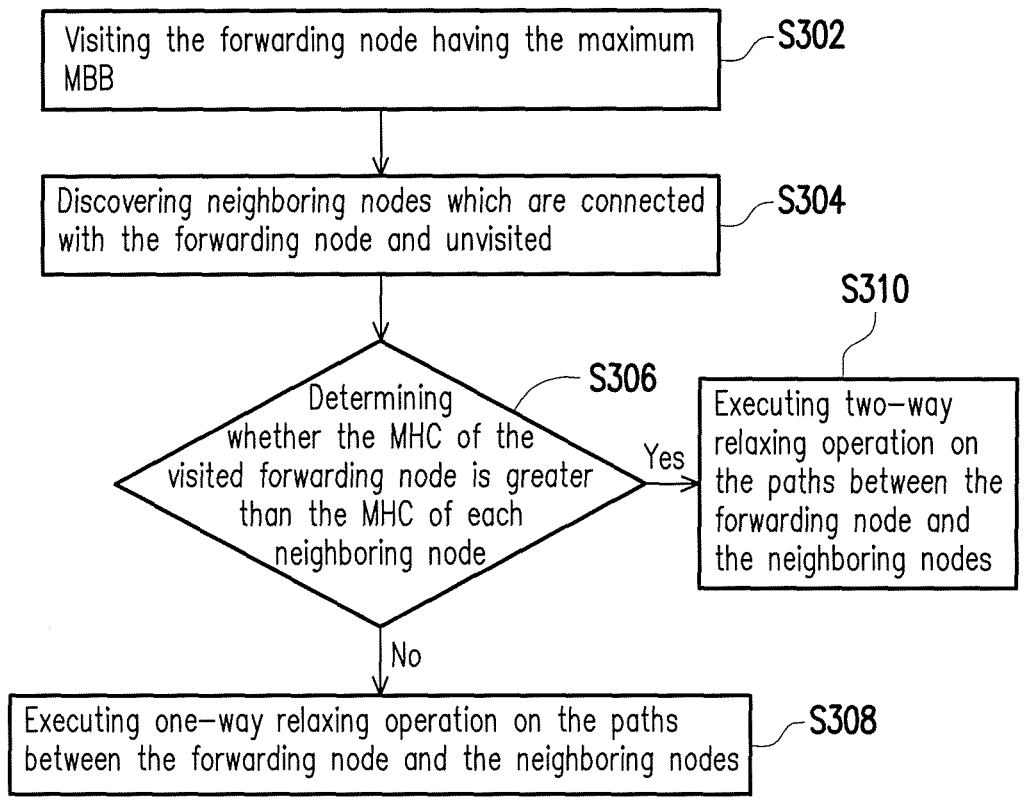
FIG. 3 is a flowchart of a method of relaxing paths between a forwarding node and neighboring nodes according to an embodiment of the present invention.

Specifically, FIG. 3 is a flowchart of a method of relaxing paths between a forwarding node and neighboring nodes according to an embodiment of the present invention. Referring to both FIG. 1 and FIG. 3, the method of the present embodiment is applicable to the SDN controller 10, and detailed steps of the method of the present embodiment will be described with reference to each element of the SDN controller 10 depicted in FIG. 1.

Whenever a node is visited, the processor 16 consecutively searches for a node having the maximum MBB among the other nodes to serve as the forwarding node (step S302), and then discovers the neighboring nodes which are connected with the forwarding node and unvisited (step S304).

For the discovered neighboring nodes, the processor further determines whether the MHC of the forwarding node is greater than the MHC of each of the neighboring nodes (step S306). If the MHC of the forwarding node is not greater than the MHC of the neighboring node, the processor 16 executes one-way relaxing operation on the paths from the forwarding node to the neighboring nodes (step 308). That is, relaxing the paths to the neighboring nodes through the forwarding node. Otherwise, if the MHC of the forwarding node is greater than the MHC of the neighboring node, the processor 16 executes two-way relaxing operation on the paths between the forwarding node and the neighboring nodes (step 310). That is, relaxing the paths to the neighboring nodes through the forwarding node, and relaxing the paths to the forwarding node through the neighboring nodes.

It should be noted that when relaxing the paths between the forwarding node and each of the neighboring nodes, the processor 16 also sets the MBB of each neighboring node as the maximum of the MBBs of the relaxed paths, and sets the MHC of each neighboring node as the smallest number of the nodes hopping from the source node to the neighboring node in each relaxed path.

Additionally, when the processor 16 completes visiting a node, the processor 16 determines whether all the nodes are visited (step S208). If no, the flow returns to step S206 to consecutively visit other unvisited nodes and performs the path relaxing operation. Otherwise, if all the nodes are visited, the processor 16 establishes a disjoint path lookup table according to relation between the paths recorded for each of the nodes in the storage device 14, and accordingly finds k disjoint paths having the maximum bottleneck bandwidth for transmitting k sub-flows divided from the data flow (step 210), wherein k is an integer larger than 1. In the disjoint path lookup table, all the paths are sorted and whether each two paths joint with each other is recorded, such that the processor 16 may determines the routing paths based on the disjoint path lookup table.

Specifically, the processor 16, for example, sorts the paths from large to small according to the MBB corresponding to each path, lists the sorted paths in the disjoint path lookup table, determines whether each pair of the paths joint with each other, and accordingly records joint information (i.e., joint or disjoint) related to each pair of the paths in the disjoint path lookup table. Then, the processor 16 sequentially searches k paths disjointing from one another to serve as a first set of paths starting from the path sorted in front of the disjoint path lookup table, repeats the previous step to continue to sequentially search k paths disjointing from one another to serve as another set of paths starting from the path sorted secondarily, and then selects a set of paths having the maximum bottleneck bandwidth from the first set of paths and the other sets of paths to serve as the k disjoint paths for transmitting the k sub-flows.

It should be noted that, in an embodiment, the processor 16 repeatedly searches another set of paths starting the path sorted in a next order until all the paths in the disjoint path lookup table are searched. In another embodiment, the processor 16 repeatedly searches another set of paths starting the path sorted in a next order until all the paths are completely searched and selects the maximum number of disjoint paths if k paths are not found.

By the aforesaid method, the SDN controller of the present embodiment may provide paths with the bandwidth as high as possible for transmitting the sub-flows divided from the data flow and ensure that the MBB of the path having the minimum MBB among the k searched paths can be maximized.

Figure 4A:
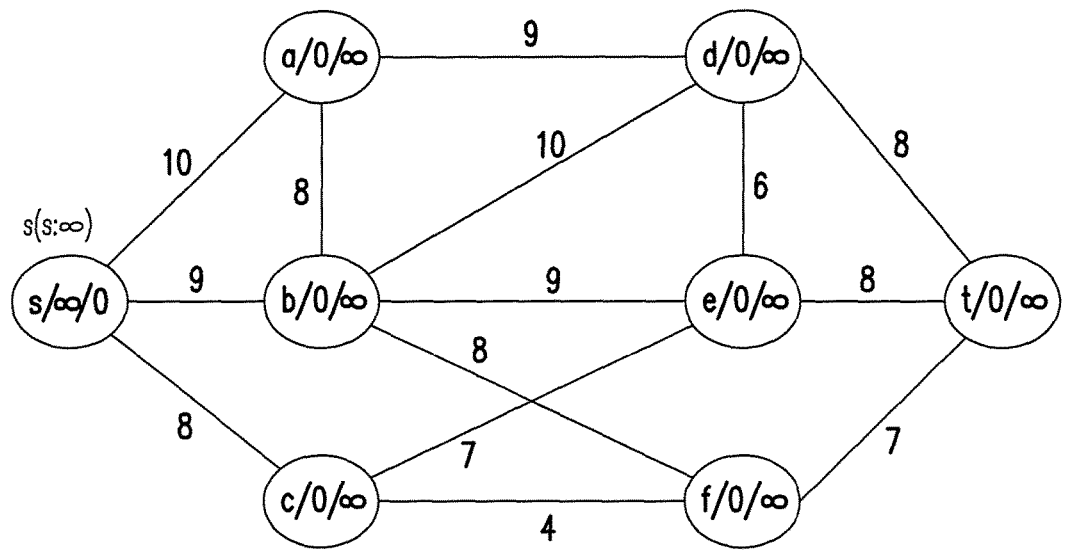
FIG. 4A to FIG. 4J illustrate examples of a multipath routing method of an SDN according to an embodiment of the invention.

FIG. 4A to FIG. 4J illustrate examples of a multipath routing method of an SDN according to an embodiment of the invention. Referring to FIG. 4A first, an SDN of the present embodiment includes a host (not shown) for transmitting a data flow and a plurality of switches (which are illustrated as nodes hereinafter for example for descriptive convenience) and a SDN controller (not shown) for controlling routing paths of the data flow. Therein, a notation of each node (i.e., circles in the illustration) is denoted by node name/MBB/MHC respectively. A node s denotes a source node, a node t denotes a terminal node, and for a path from the node s to the node t, the minimum remaining bandwidth on the edges passed by a path may be considered as a bottleneck bandwidth of the path. If there are multiple paths from the node s to an arbitrary node v, a maximum of the bottleneck bandwidths of the paths denotes the MBB of the node v, and the number of hops of the shortest path among the paths denotes the MHC of the path from s to v.

Taking the node s in FIG. 4A as an example, the notation (s/∞/0) denotes that the node name is s, the MBB is ∞ and the MHC is 0. A connection between any two nodes is bidirectional, and a numeral labeled on each connection denotes a remaining bandwidth of an edge of the connection. In FIG. 4A, only the MBB and the MHC of the source node s are initiated as ∞/0, and the MBB and the MHC of each of the rest of the nodes are initiated as 0/∞. All the nodes in FIG. 4A are preset as unvisited and undiscovered.

Figure 4B:
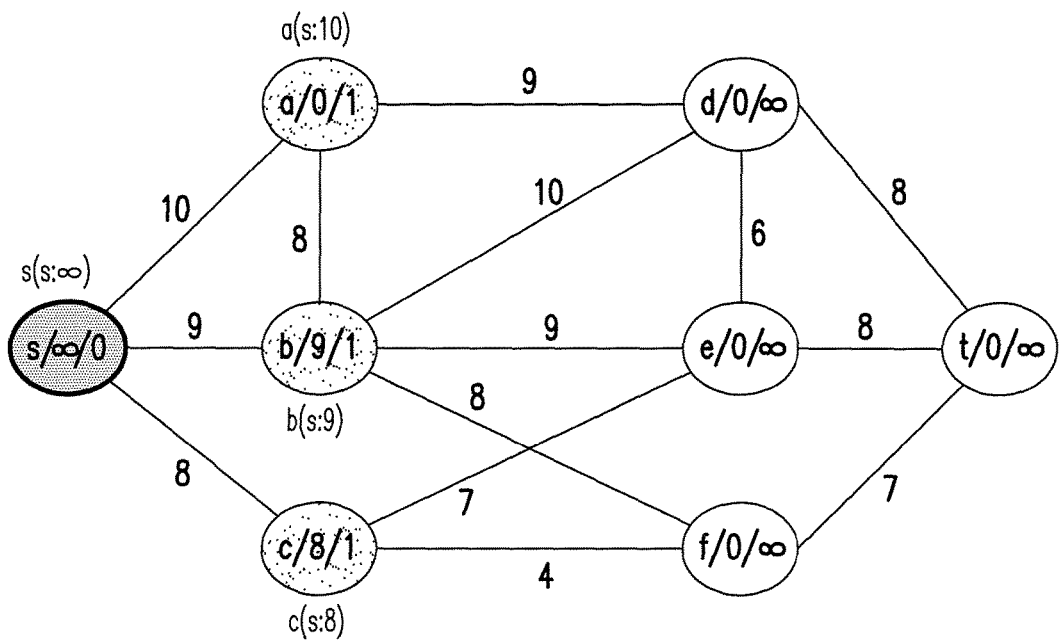

Referring to FIG. 4B, when executing the SDN multipath routing method of the present embodiment, the SDN controller first visits the source node (a currently visited node is denoted by a dark bold frame hereinafter) and discovers neighboring nodes a, b and c thereof (currently discovered nodes are denoted in a light-color frame). Before executing the path relaxing operation, the SDN controller compares the MHCs of the nodes a, b and c with the MHC of the source node s, and after confirming that the MHC of the source node s (which is 0) is smaller than the MHC of each of the nodes a, b and c (which is ∞), the SDN controller executing one-way relaxing operation on the nodes a, b and c. After the relaxing operation, the node a obtains a path from the source node s (which is labeled as a(s:10) in the illustration), and the path has a bottleneck bandwidth of 10. Accordingly, the SDN controller sets the MBB of the node a as 10, and sets the MHC of the node a as 1 (denoting a hop count of 1). To deduce by analogy, the SDN controller respectively completes the path relaxing operation on the paths to the nodes b and c and the setting of the MBBs and MHCs of the nodes b and c.

Figure 4C:
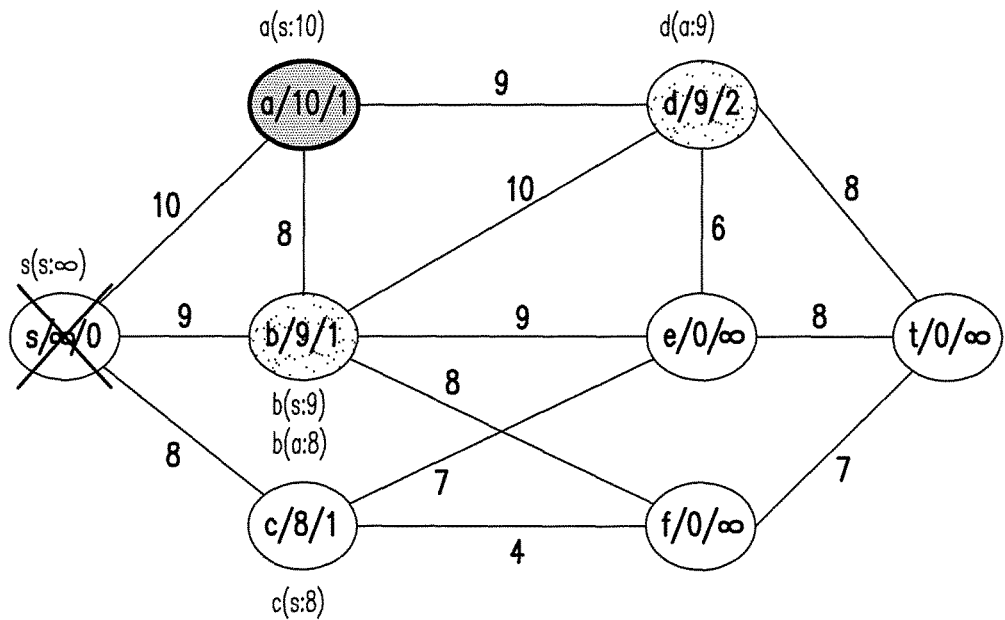

Referring to FIG. 4C, after executing the path relaxing operation on the source node s, the SDN controller sets the source node s as being visited (the visited node is marked with a cross), and consecutively visits the next node. In this stage, the node a has a maximum MBB (i.e., 10) among the rest of the nodes in the SDN, and thus, the SDN controller consecutively visits the node a and discovers its neighboring nodes b and c. Before performing the path relaxing operation, the SDN controller sets the MBB of the node d as 9, and sets the MHC of the node d as 2 (denoting a hop count of 2). Thereafter, the SDN controller compares the MHCs of the nodes b and d with the MHC of the node a, and after confirming that the MHC of the node a (which is 1) is smaller than or equal to the MHC of the nodes b and d (which is 1), the SDN controller executing one-way relaxing operation on the nodes b and d. After the relaxing operation, the node b obtains a path from the node a (which is labeled as b(a:8) in the illustration), and the path has a bottleneck bandwidth of 8. Additionally, the node d obtains a path from the node a (which is labeled as d(a:9) in the illustration), and the path has a bottleneck bandwidth of 9.

Figure 4D:
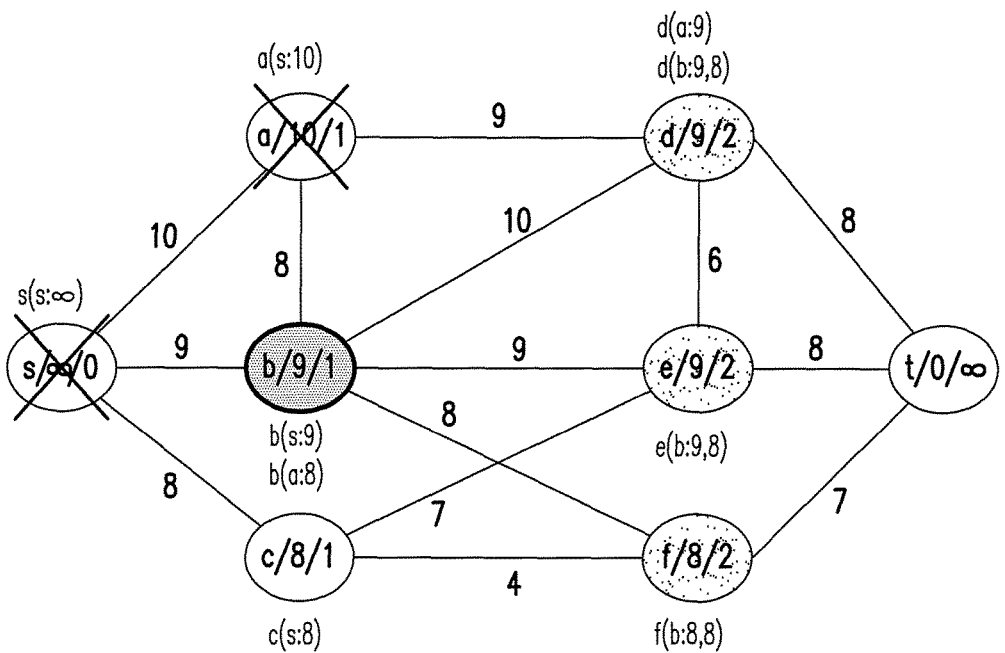

Referring to FIG. 4D, after executing the path relaxing operation on the node a, the SDN controller sets the node a as being visited and consecutively the next node. In this stage, the node b among the rest of the nodes in the SDN has the largest bottleneck bandwidth (which is 9) and has the smallest hop count, and thus, the SDN controller consecutively visits the node b and discovers its neighboring nodes d, e and f. Before performing the path relaxing operation, the SDN controller sets the MBB of the node e as 9, and sets the MHC of the node d as 2; and sets the MBB of the node f as 8, and sets the MHC of the node f as 2. Thereafter, the SDN controller compares the MHCs of the nodes d, e and f with the MHC of the node b, and after confirming that the MHC of the node b (which is 1) is smaller than or equal to the MHCs of the nodes d, e and f (which is 2), the SDN controller executes one-way relaxing operation on the nodes d, e and f. After the relaxing operation, the node d obtains two paths from the node b (which are labeled as d(b:9,8) in the illustration), and the paths respectively have bottleneck bandwidths of 9 and 8. Additionally, the node e obtains two paths from the node b (which are labeled as e(b:9,8) in the illustration), and the paths respectively have bottleneck bandwidths of 9 and 8. The node f obtains two paths from the node b (which are labeled as f(b:8,8) in the illustration), and both the paths have bottleneck bandwidths of 8.

Figure 4E:
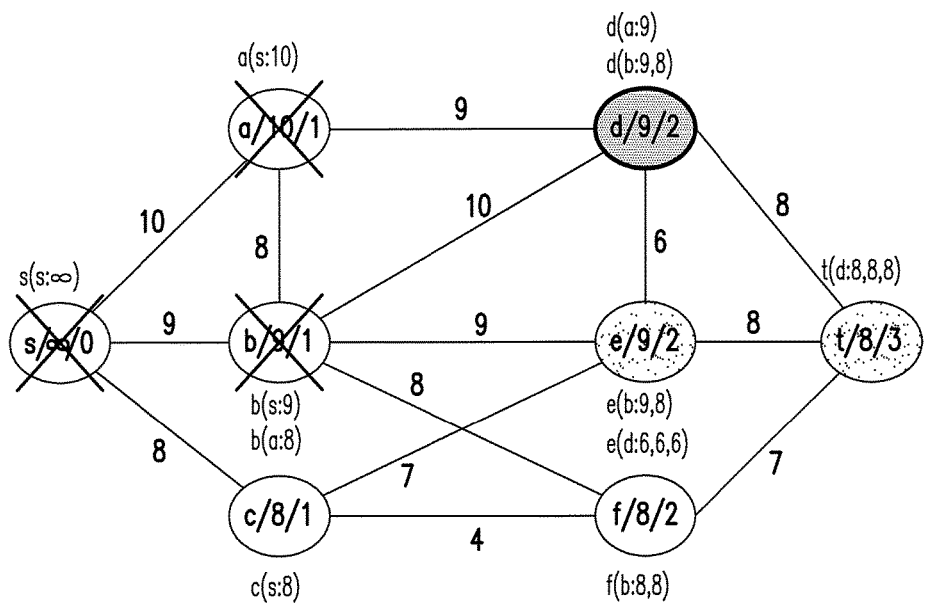

Referring to FIG. 4E, after executing the path relaxing operation on the node b, the SDN controller sets the node b as being visited and consecutively visits the next node. In this stage, the nodes d and e among the rest of the nodes have the same MBB and MHC. Thus, the one having a smaller identifier (ID) order (which is the node d) is preferentially processed, and the SDN controller consecutively visits the node d and discovers its neighboring nodes e and t. Before performing the path relaxing operation, the SDN controller sets the MBB of the node t as 8, and sets the MHC of the node t as 3. Thereafter, the SDN controller compares the MHCs of the nodes e and t with the MHC of the node d, and after confirming that the MHC of the node d (which is 2) is smaller than or equal to the MHCs of the nodes e and t (which is 2), the SDN controller executes one-way relaxing operation on the nodes e and t. After the relaxing operation, the node e obtains three paths from the node d (which are labeled as e(d:6,6,6) in the illustration), and all the paths have bottleneck bandwidths of 6. Additionally, the node t also obtains three paths from the node d (which are labeled as t(d:8,8,8) in the illustration), and all the paths have bottleneck bandwidths of 8.

Figure 4F:
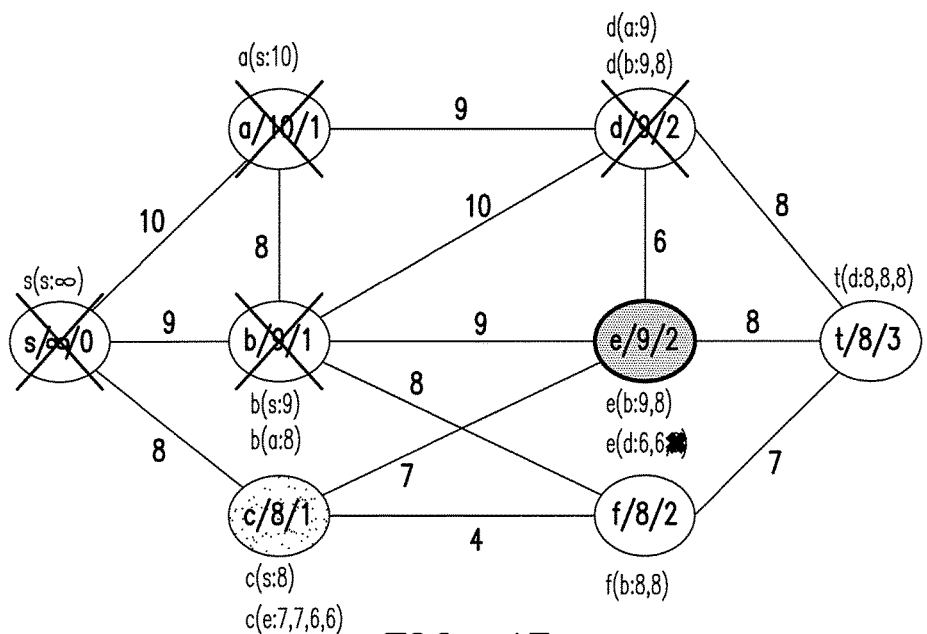

Referring to FIG. 4F, after executing the path relaxing operation on the node d, the SDN controller sets the node d as being visited and consecutively visits the next node. In this stage, the node e has the maximum MBB (i.e., 9) among the rest of the nodes in the SDN, and thus, the SDN controller consecutively visits the node e and discovers its neighboring nodes c and t. It should be noted that in order to reduce time complexity of subsequent path relaxing operation, the number of the paths recorded for each node is controlled to be within an upper limit (which is 4) in the present embodiment. Accordingly, the SDN controller reduces the 5 paths obtained by the node e in the previous relaxing operation to 4 paths (where the path having the smallest bottleneck bandwidth is deleted).

Figure 4G:
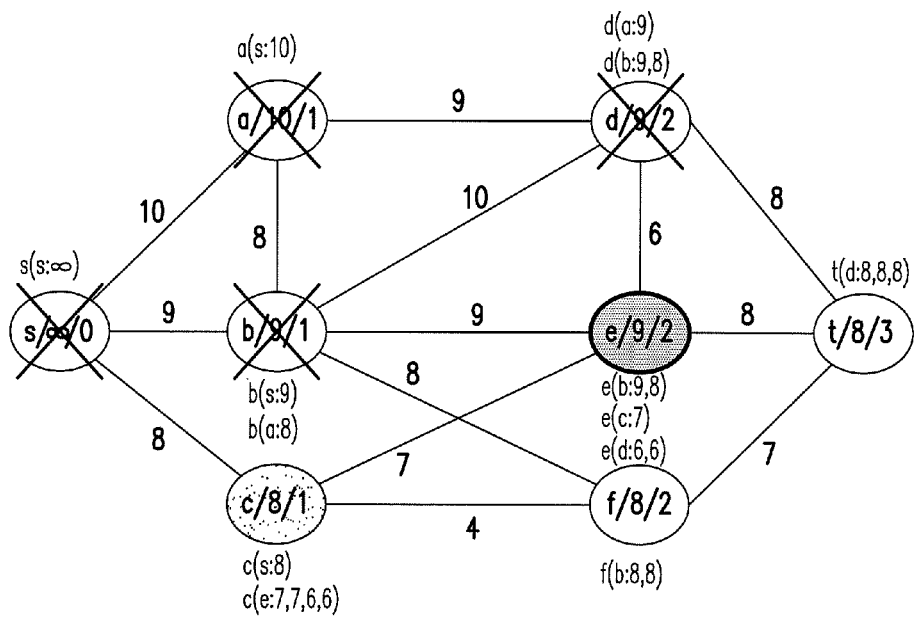

Referring to FIG. 4G, before executing the path relaxing operation, the SDN controller compares the MHC of the node c with the MHC of the node e, and after confirming that the MHC of the node e (which is 2) is greater than the MHC of the node c (which is 1), the SDN controller executes two-way relaxing operation on the nodes c, which includes relaxing the paths to the node c through the node e, the node c obtains 4 paths from the node e (which are labeled as c(e:7,7,6,6) in the illustration), and the paths respectively have bottleneck bandwidths of 7, 7, 7 and 6. Additionally, the node t also obtains 3 paths from the node d (which are labeled as t(d:8,8,8) in the illustration), and all the paths have bottleneck bandwidths of 8.

Figure 4H:
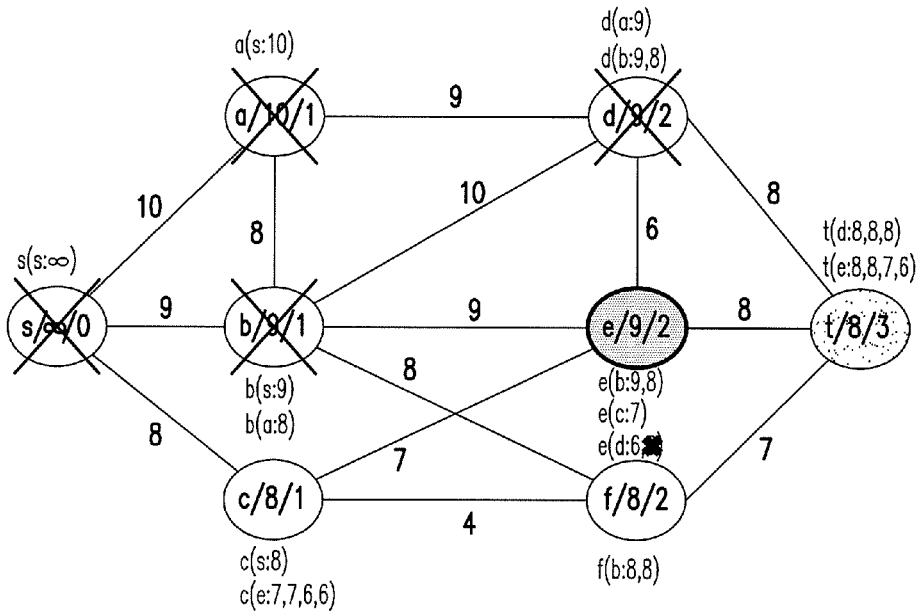

On the other hand, referring to FIG. 4H, the SDN controller also relaxes the paths from the node c to the node e. The node e obtains a path from the node c (which is labeled as e(c:7) in the illustration), and the path has a bottleneck bandwidth of 7. Since the number of paths of the node e is over the upper limit due to the path e(c:7) being added to the node e, the SDN controller again deletes the path having the smallest bottleneck bandwidth from the 5 paths. Thereafter, the SDN controller relaxes the paths from the node e to the node t, the node t obtains 4 paths from the node e (which are labeled as t(e:8,8,7,6) in the illustration), and the paths respectively have bottleneck bandwidths of 8, 8, 7 and 6.

Figure 4I:
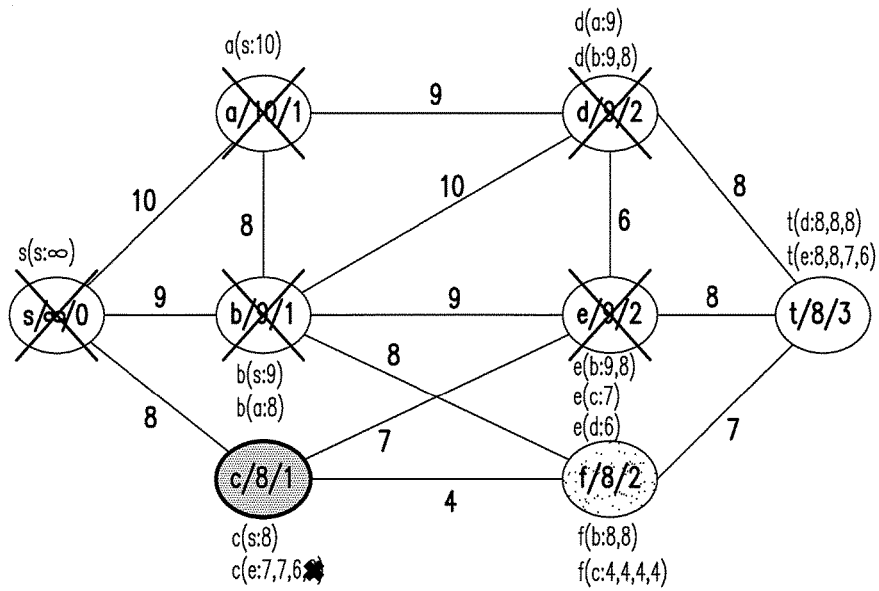

Referring to FIG. 4I, after executing the path relaxing operation on the node e, the SDN controller sets the node e as being visited and consecutively visits the next node. In this stage, the node c among the rest of the nodes in the SDN has the maximum MBB (i.e., 8), and thus, the SDN controller consecutively visits the node c and discovers its neighboring node f. Similarly, the SDN controller first reduces the 5 paths obtained by the node c in the previous relaxing operation to 4 paths (where the path having the smallest bottleneck bandwidth is deleted). Thereafter, before executing the path relaxing operation, the SDN controller compares the MHC of the node f with the MHC of the node c, and after confirming that the MHC of the node c (which is 1) is smaller than or equal to the MHC of the node f (which is 2), the SDN controller executes one-way relaxing operation on the node f. After the relaxing operation, the node f obtains 4 paths from the node c (which are labeled as f(c:4,4,4,4) in the illustration), and all the paths have bottleneck bandwidths of 4.

Figure 4J:
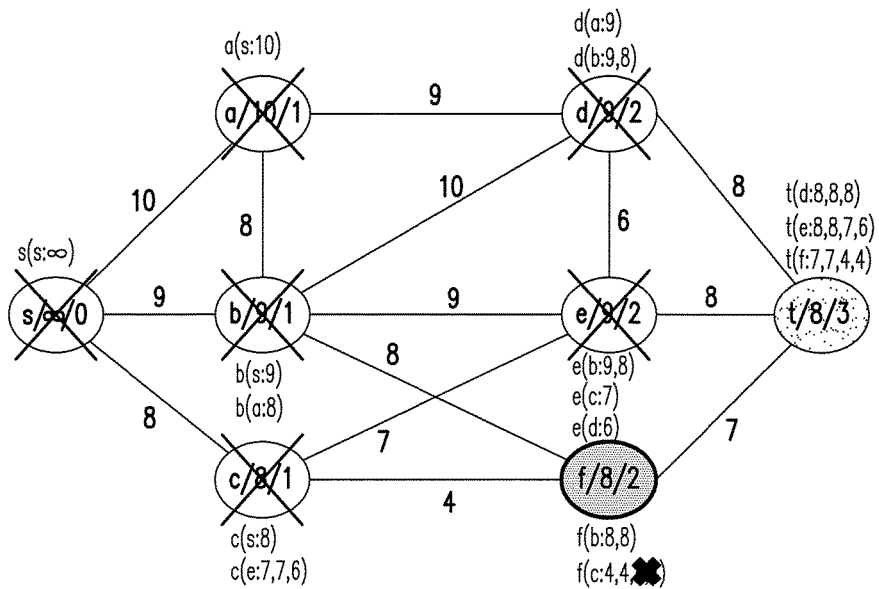

Referring to FIG. 4J, after executing the path relaxing operation on the node c, the SDN controller sets the node c as being visited and consecutively the next node. In this stage, the node f among the rest of the nodes in the SDN has the maximum MBB (i.e., 8), and thus, the SDN controller consecutively visits the node f and discovers its neighboring node t. The SDN controller first reduces the 6 paths obtained by the node f in the previous relaxing operation to 4 paths (where 2 paths having the smallest bottleneck bandwidth are deleted). Thereafter, before executing the path relaxing operation, the SDN controller compares the MHC of the node t with the MHC of the node f, and after confirming that the MHC of the node f (which is 2) is smaller than or equal to the MHC of the node t (which is 3), the SDN controller executes one-way relaxing operation on the node t. After the relaxing operation, the node t obtains 4 paths from the node f (which are labeled as t(f:7,7,4,4) in the illustration), and the paths respectively have bottleneck bandwidths of 7, 7, 4 and 4. Finally, the SDN controller visits the node t and obtains 11 paths (including the paths t(d:8,8,8), t(e:8,8,7,6) and t(f:7,7,4,4) as illustrated in FIG. 4J.

With respect to the aforesaid 11 paths, the SDN controller consecutively establishes a disjoint path lookup table, and accordingly finds k disjoint paths having the maximum bottleneck bandwidth for transmitting k sub-flows.

Figures 5A, 5B:
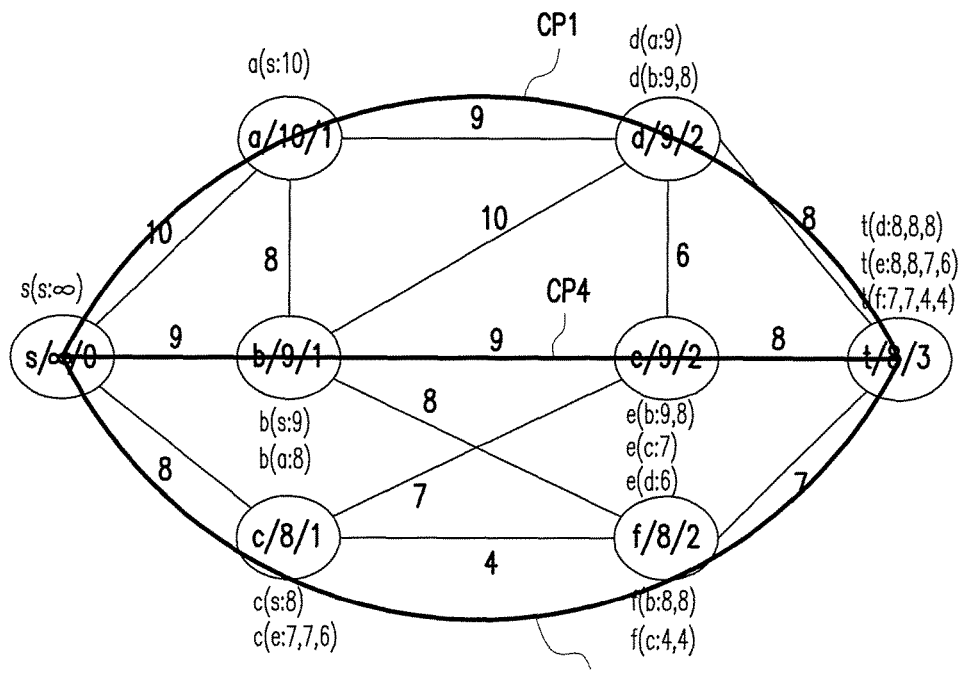
FIG. 5A and FIG. 5B illustrate examples of searching k disjoint paths having the maximum bottleneck bandwidth according to an embodiment of the present invention.

For example, FIG. 5A and FIG. 5B illustrate examples of searching k disjoint paths having the maximum bottleneck bandwidth according to an embodiment of the present invention. Referring to FIG. 5A, in the present embodiment, the 11 paths obtained by the node t in the preceding embodiment are sorted according to the size of the MBB corresponding to each path and listed in a sequence from large to small in a disjoint path lookup table 50 (the paths are labeled as paths $cp_1$ to $cp_{11}$, wherein $cp_1$ has the largest bottleneck bandwidth, and $cp_{11}$ has the smallest bottleneck bandwidth). It should be noted that the paths $cp_1$ to $cp_{11}$ are sequentially listed in longitudinal columns and lateral rows in the disjoint path lookup table 50, and whether any two paths joint with or disjoint from each other is recorded in an intersecting position of the two paths in the table (wherein 1 denotes disjoint, and 0 denotes joint).

According to the disjoint path lookup table 50, in the present embodiment, the path $cp_1$ which is sorted in the front serves as the first path of a first set of paths, and k paths disjointing from one another are sequentially searched starting from the path $cp_1$ (3 paths are used as an example in the present embodiment, but the disclosure is not limited thereto). According to a row 52 where the path $cp_1$ is located in the table, the next path disjointing from the path $cp_1$ among all the paths $cp_1$ to $cp_{11}$ is the path $cp_4$, and thus, the path $cp_4$ is selected as a second path of the first set of paths. By consecutively searching, the next path disjointing from the path $cp_1$ is the path $cp_6$, but the path $cp_6$ joints with the path $cp_4$, and thus, the path $cp_6$ is not included in the first set of paths. Thereafter, by consecutively searching, the next path disjointing from the path $cp_1$ is the path $cp_7$, but the path $cp_7$ also joints with the path $cp_4$, and thus, the path $cp_7$ is also not included in the first set of paths. Thereafter, by consecutively searching, the next path disjointing from the path $cp_1$ is the path $cp_{10}$, and since the path $cp_{10}$ disjoints from the path $cp_4$, the path $cp_{10}$ serves as a third path of the first set of paths. As such, the searching operation of the first set of paths is completed. FIG. 5B illustrates the searched first set of paths (i.e., the paths $cp_1$, $cp_4$ and $cp_{10}$) as described above.

Figures 6A, 6B:
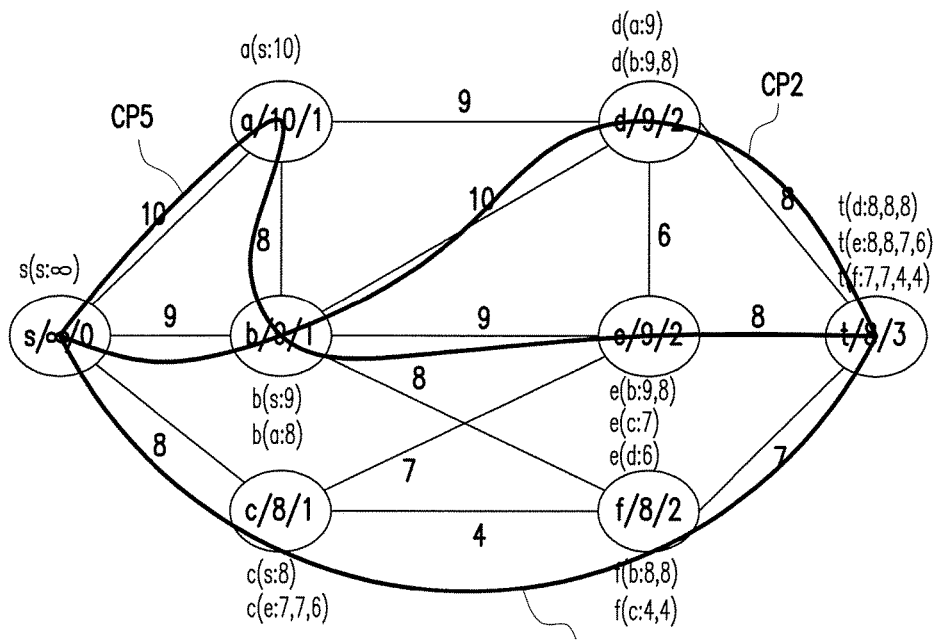
FIG. 6A and FIG. 6B illustrate examples of searching k disjoint paths having the maximum bottleneck bandwidth according to an embodiment of the present invention.

FIG. 6A and FIG. 6B illustrate examples of searching k disjoint paths having the maximum bottleneck bandwidth according to an embodiment of the present invention. Referring to FIG. 6A, the present embodiment follows the embodiment illustrated in FIG. 5A, where a second set of paths is consecutively searched according to the disjoint path lookup table 50. In the present embodiment, the path $cp_2$ which is sorted secondarily serves as a first path of the second set of paths, and 3 paths disjointing from one another are sequentially searched by starting from the path $cp_2$. According to a row 54 where the path $cp_2$ is located in the table, the next path disjointing from the path $cp_2$ among all the paths $cp_1$ to $cp_{11}$ is the path $cp_5$, and thus, the path $cp_5$ is selected as a second path of the second set of paths. By consecutively searching, the next path disjointing from the path $cp_2$ is the path $cp_6$, but the path $cp_6$ joints with the path $cp_5$, and thus, the path $cp_6$ is not included in the second set of paths. Then, by consecutively searching, the next 2 paths disjointing from the path $cp_2$, are the paths $cp_5$ and $cp_9$, but both the 2 paths joint with the path $cp_5$, and thus, the paths $cp_5$ and $cp_9$ are also not included in the second set of paths. The next path, which is the path $cp_{10}$, disjoints from the path $cp_1$ and is selected as a third path in the second set of paths since the path $cp_{10}$ disjoints from the path $cp_5$. As such, the searching operation of the second set of paths is completed. FIG. 6B illustrates the searched second set of paths (i.e., the paths $cp_2$, $cp_5$ and $cp_{10}$) as described above.

Figures 7A, 7B:
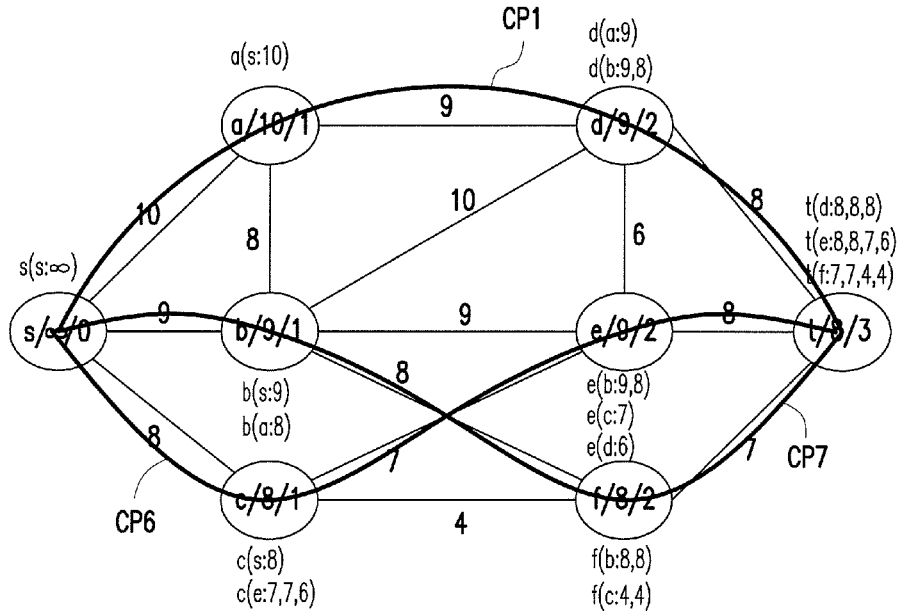
FIG. 7A and FIG. 7B illustrate examples of searching k disjoint paths having the maximum bottleneck bandwidth according to an embodiment of the present invention.

FIG. 7A and FIG. 7B illustrate examples of searching k disjoint paths having the maximum bottleneck bandwidth according to an embodiment of the present invention. Referring to FIG. 7A, the present embodiment follows the embodiment illustrated in FIG. 6A, where a third set of paths is consecutively searched according to the disjoint path lookup table 50. By serving any one of the paths $cp_3$ to $cp_5$ after the path $cp_2$ as the first path, it cannot find 3 disjoint paths, and the 3 disjoint paths are found until serving the path $cp_6$ as a first path of the third set of paths. According to a row 56 where the path $cp_6$ is located in the table, the next path disjointing from the path $cp_6$ among all the paths $cp_1$ to $cp_{11}$ is the path $cp_1$, and thus, the path $cp_1$ is selected as a second path of the third set of paths. By consecutively searching, the next 2 paths disjointing from the path $cp_6$ are the paths $cp_2$ and $cp_3$, but both the 2 paths jointing with the path $cp_1$, and thus, the paths $cp_2$ and $cp_3$ are not included in the third set of paths. The next path, which is the path $cp_7$, disjoins from the path $cp_6$ and is selected as a third path in the third set of paths since the path $cp_7$ disjoints from the path $cp_1$. As such, the searching operation of the third set of paths is completed. FIG. 7B illustrates the searched third set of paths (i.e., the paths $cp_1$, $cp_6$ and $cp_7$) as described above.

In the present embodiment, the SDN controller selects the aforementioned three sets of paths for comparison, so as to find k disjoint paths having the maximum bottleneck bandwidth. The paths $cp_1$, $cp_4$ and $cp_{10}$ in the first set of paths respectively have bandwidths of 8, 8 and 4, and therefore the smallest bottleneck bandwidth is 4. The paths $cp_2$, $cp_5$ and $cp_{10}$ in the second set of paths respectively have bandwidths of 8, 8 and 4, and therefore the smallest bottleneck bandwidth is 4. The paths $cp_1$, $cp_6$ and $cp_5$ in the third set of paths respectively have bandwidths of 8, 7 and 7, and therefore the smallest bottleneck bandwidth is 7. Accordingly, the SDN controller finally selects the third set of paths having the maximum MBB for transmitting the 3 sub-flows.

Based on the above, in the SDN controller and the multipath routing method thereof provided by the disclosure, the routing problem to find k disjoint paths having the maximum bottleneck bandwidth is formulated by dividing the data flow into multiple sub-flows and distributing the sub-flows from the same set of end-to-end transmission to different paths by utilizing the proposed heuristic algorithm. In this way, the issue that the sub-flows compete for the network resources can be prevented, the bandwidth difference of each path can be reduced, and the throughput of the end-to-end transmission can be effectively increased.

Although the invention has been disclosed by the above embodiments, they are not intended to limit the invention. It will be apparent to one of ordinary skill in the art that modifications and variations to the invention may be made without departing from the spirit and scope of the invention. Therefore, the scope of the invention will be defined by the appended claims.

What is claimed is:

1. A multipath routing method of a software-defined network (SDN), adapted to divide a data flow into k subflows for transmission by a controller, wherein k is an integer larger than 1, the method comprising:

initiating a maximum bottleneck bandwidth (MBB) and a minimum hop count (MHC) of each of a plurality of nodes in the SDN, wherein the MBB of each of the nodes is initiated as 0, and the MHC of each of the nodes is initiated as infinite;

visiting a source node of the nodes, discovering neighboring nodes connected with the source node to relax paths between the source node and each of the neighboring nodes, and setting the source node as being visited and recording the relaxed paths after the paths are relaxed;

visiting the node having a maximum MBB among other unvisited nodes to serve as a forwarding node, discovering neighboring nodes which are connected with the forwarding node and unvisited to relax the paths between the forwarding node and each of the neighboring nodes, and setting the forwarding node as being visited and recording the relaxed paths after the paths are relaxed;

repeating the previous step to consecutively visit the other unvisited nodes among the nodes until all the nodes are visited; and establishing a disjoint path lookup table according to a relation between the paths recorded for each of the nodes, and accordingly finding k disjoint paths having the maximum bottleneck bandwidth for transmitting the k sub-flows.

2. The method according to claim 1, wherein the step of discovering the neighboring nodes which are connected with the forwarding node and unvisited to relax the paths between the forwarding node and each of the neighboring nodes comprises:

determining whether the MHC of the visited forwarding node is greater than the MHC of each of the discovered neighboring nodes;

if yes, executing one-way relaxing operation on the paths between the forwarding node and each of the neighboring nodes; and if no, executing two-way relaxing operation on the paths between the forwarding node and each of the neighboring nodes.

3. The method according to claim 2, wherein the one-way relaxing operation comprises relaxing the paths to each of the neighboring nodes through the forwarding node; and the two-way relaxing operation comprises relaxing the paths to each of the neighboring nodes through the forwarding node, and relaxing the paths to the forwarding node through each of the neighboring nodes.

4. The method according to claim 1, wherein the step of recording the relaxed paths comprises:

determining whether the number of the paths recorded for each of the nodes is greater than m, wherein m is an integer larger than 1; and if the number is greater than m, retaining only former m paths having the largest MBBs among the relaxed paths.

5. The method according to claim 1, wherein the step of establishing the disjoint path lookup table according to the relation between the paths recorded for each of the nodes comprises:

sorting the paths according to the MBB corresponding to each of the paths, and listing the sorted paths in the disjoint path lookup table; and determining whether each pair of the paths joint with each other, and accordingly recording joint information related to each pair of the paths in the disjoint path lookup table.

6. The method according to claim 5, wherein the step of finding the k disjoint paths having the maximum bottleneck bandwidth for transmitting the k sub-flows according to the disjoint path lookup table comprises:

sequentially searching k paths disjointing from one another to serve as a first set of paths starting from the path sorted in front of the disjoint path lookup table;

repeating the previous step to sequentially search k paths disjointing from one another to serve as another set of paths starting from the path sorted secondarily in the disjoint path lookup table; and selecting a set of paths having the maximum bottleneck bandwidth from the first set of paths and the another sets of paths to serve as the k disjoint paths.

7. The method according to claim 6, wherein the step of sequentially search the k paths disjointing from one another to serve as the another set of paths starting from the path sorted secondarily in the disjoint path lookup table comprises:

sequentially searching k paths disjointing from one another to serve as another set of paths starting from the path sorted secondarily in the disjoint path lookup table until all the paths in the disjoint path lookup table are searched.

8. The method according to claim 1, further comprising:

after the relaxing for the paths between the forwarding node and each of the neighboring nodes are completed, setting the MBB of each of the neighboring nodes as a maximum of the MBBs of the relaxed paths, and setting the MHC of each of the neighboring nodes as a smallest number of nodes hopping from the source node to the neighboring node in each of the relaxed paths.

9. A software-defined network controller, comprising:

a network interface device, coupled to a plurality of nodes in an SDN;

a storage device; and a processor, coupled to the network interface device and the storage device, wherein the processor initiates an MBB and an MHC of each of the nodes in the SDN after receiving a transmission request of a data flow, wherein the processor initiates the MBB of each of the nodes as 0 and initiates the MHC of each of the nodes as infinite;

the processor visits a source node among the nodes, discovers neighboring nodes connected with the source node to relax paths between the source node and each of the neighboring nodes, and sets the source node as being visited and records the relaxed paths after relaxing the paths;

the processor visits the node having a maximum MBB among other unvisited nodes to serve as a forwarding node, discovers neighboring nodes which are connected with the forwarding node and unvisited to relax the paths between the forwarding node and each of the neighboring nodes, sets the forwarding node as being visited and records the relaxed paths in the storage device after relaxing the paths, and repeats the previous step until all the nodes are visited; and the processor establishes a disjoint path lookup table according to a relation between the paths recorded for each of the nodes in the storage device, and accordingly finds k disjoint paths having the maximum bottleneck bandwidth for transmitting k sub-flows divided from the data flow, wherein k is an integer larger than 1.

10. The controller according to claim 9, wherein the processor determines whether the MHC of the visited forwarding node is greater than the MHC of each of the discovered neighboring nodes, and accordingly determines whether to execute a one-way relaxing operation or a two-way relaxing operation on the paths between the forwarding node and the neighboring nodes.

11. The controller according to claim 10, wherein the one-way relaxing operation comprises relaxing the paths to each of the neighboring nodes through the forwarding node; and the two-way relaxing operation comprises relaxing the paths to each of the neighboring nodes through the forwarding node, and relaxing the paths to forwarding node through each of the neighboring nodes.

12. The controller according to claim 9, wherein the processor determines whether the number of the paths recorded for each of the nodes is greater than m, wherein m is an integer larger than 1, and if the number is greater than m, the processor retains only former m paths having the largest MBBs among the relaxed paths.

13. The controller according to claim 9, wherein the processor sorts the paths according to the MBB corresponding to each of the paths, and lists the sorted paths in the disjoint path lookup table, determines whether each pair of the paths joint with each other, and accordingly records joint information related to each pair of the paths in the disjoint path lookup table.

14. The controller according to claim 13, wherein the processor sequentially searches k paths disjointing from one another to serve as a first set of paths starting from the path sorted in front of the disjoint path lookup table, repeats the previous step to sequentially search k paths disjointing from one another to serve as another set of paths starting from the path sorted secondarily in the disjoint path lookup table, and selects a set of paths having the maximum bottleneck bandwidth from the first set of paths and the another sets of paths to serve them as the k disjoint paths.

15. The controller according to claim 14, wherein the processor sequentially searches k paths disjointing from one another to serve as another set of paths starting from the path sorted secondarily in the disjoint path lookup table until all the paths in the disjoint path lookup table are searched, wherein if k paths are not found, the processor selects the maximum number of disjoint paths.

16. The controller according to claim 9, after the relaxing for the paths between the forwarding node and each of the neighboring nodes are completed, the processor sets the MBB of each of the neighboring nodes as a maximum of the MBBs of the relaxed paths, and sets the MHC of each of the neighboring nodes as a smallest number of nodes hopping from the source node to the neighboring node in each of the relaxed paths.

* * * * *